United States Patent [19]
Hay

[11] 3,956,144
[45] *May 11, 1976

[54] FLAME-RETARDANT SOFTENING AGENTS
[75] Inventor: Peter M. Hay, Summit, N.J.
[73] Assignee: Sandoz, Inc., E. Hanover, N.J.
[ * ] Notice: The portion of the term of this patent subsequent to May 25, 1993, has been disclaimed.
[22] Filed: Sept. 16, 1974
[21] Appl. No.: 506,234

[52] U.S. Cl. .................. 252/8.8; 252/8.1; 260/403; 428/245; 428/265; 428/267
[51] Int. Cl.² ........................ D06M 13/26
[58] Field of Search ............ 252/8.8, 8.1; 117/136, 117/139.5 F; 260/45.9 NP, DIG. 24

[56] References Cited
UNITED STATES PATENTS

| | | | |
|---|---|---|---|
| 2,340,881 | 2/1944 | Kelley et al. | 252/8.8 |
| 2,541,101 | 2/1951 | Robinette et al. | 252/8.8 |
| 2,662,834 | 12/1953 | Paist et al. | 117/136 |
| 3,046,297 | 7/1962 | Overbeek et al. | 252/8.1 |
| 3,660,582 | 5/1972 | DiPietro et al. | 117/136 |
| 3,719,547 | 3/1973 | Martin et al. | 161/191 |
| 3,719,597 | 3/1973 | Wegerhoff et al. | 252/8.8 |

FOREIGN PATENTS OR APPLICATIONS 1,534,719   8/1968   France

OTHER PUBLICATIONS

Rayner, et al., *Chemical Abstracts*, Vol. 64: 16,1336, (1966).
Mayer, et al., *Chemical Abstracts*, Vol. 76: 60,8684 (1972).
Barton et al., *Chemical Abstracts*, Vol. 76: 128,618u (1972).

*Primary Examiner*—John C. Bleutge
*Assistant Examiner*—W. C. Danison, Jr.
*Attorney, Agent, or Firm*—Gerald D. Sharkin; Richard E. Vila; Joseph J. Borovian

[57] ABSTRACT

Softening agents, especially useful for treatment of synthetic fiber shag carpeting, to impart softening and anti-soiling properties and which do not increase the inherent flammability of the carpeting are provided by reacting a fatty mono- or polyamine with tris-(2,3-dibromopropyl)-phosphate.

18 Claims, No Drawings

FLAME-RETARDANT SOFTENING AGENTS

Substantial amounts of softening agents are consumed in the commercial manufacture and finishing of a host of textile products including those of synthetic and natural fibers, including carpet materials, such as polyester shag carpeting. Certain of these softening agents, such as those referred to as fatty acid amide-amines, also impart anti-soiling properties but have the disadvantage of undesirably increasing the flammability of the fabric. Additionally, many softening agents, including the fatty acid amide-amines, also suffer from the disadvantage of being poorly water-dispersible, and can only be rendered water-dispersible by the addition of substantial amounts of other reagents, e.g., acetic acid, which in many cases serve no useful purpose in the ultimate commercial processes and often further deleteriously affect the flammability. Thus, there is a real need in the art for water-dispersible, flame-retardant softening agents.

Accordingly, an object of this invention is to provide novel, flame-retardant, softening agents.

Another object of this invention is to provide novel, flame-retardant, softening agents exhibiting anti-soiling properties.

Still another object of this invention is to provide novel, flame-retardant, softening agents exhibiting good water dispersibility.

Yet, still another object of this invention is to provide novel, flame-retardant, water-dispersible amine and/or polyamine derivatives exhibiting softening and anti-soiling properties.

In accordance with the present invention, water-dispersible, flame-retardant, softening agents are provided by the product obtained on reacting A) the phosphate compound of the formula I:

$$(BrCH_2-CHBrCH_2O)_3PO \qquad I$$

with B) a compound or mixture of compounds of the formula II:

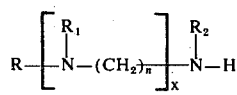

$$R\left[\!\!\begin{array}{c}R_1\\|\\N-(CH_2)_n\end{array}\!\!\right]_x\!\!\begin{array}{c}R_2\\|\\N-H\end{array} \qquad II$$

wherein
R is a monovalent aliphatic hydrocarbon radical containing 10 to 24 carbon atoms,
$R_1$ and $R_2$ are independently hydrogen, lower alkyl of 1 to 4 carbon atoms, or hydroxyalkyl of 2 to 3 carbon atoms,
$n$ is 2 or 3, and
$x$ is 0, 1 or 2;

the weight ratio of reactant B to reactant A being in the range of from 10:1 to 1:1.

The reaction of the compound I (reactant A) with compound II (reactant B) may be carried out over a fairly wide range of temperatures of from about 30°C. to 150°C., preferably 40°C. to 130°C. The reaction may be carried out in the presence or absence of added solvents and is preferably carried out in the absence of added solvents, e.g., in the melt or in aqueous suspension, at temperatures more preferably in the range of from 50°C. to 120°C., desirably between 60°C. and 100°C. When carried out in the presence of a solvent, the solvent may be any of several conventional organic types providing an inert medium. Examples of such solvents include toluene, perchlorethylene, acetone and the like. The reaction is carried out with the application of shearing forces suitable to intimately admix the reactants, e.g., in a mixing vessel. The reaction time is not particularly important and will vary depending upon a number of factors such as the presence or absence of a solvent and the weight ratio of reactant B to reactant A. In general, the reaction may be substantially completed in as little as 2 minutes or may be extended until a period of 12 or more hours has elapsed. In practice, reaction times are usually in the range of from about 4 minutes to 2 hours, more usually in the range of from about 5 minutes to 60 minutes. Under the more preferred conditions for forming the more preferred products of the invention, i.e., in absence of added solvent, the reaction time usually varies between 8 to 25 minutes. In general, it is desirable to regulate time and temperature to form the desired product without causing any substantial discoloration of the product. The reaction may be effected above or below normal atmospheric pressure, but is conveniently and preferably effected at about normal atmospheric pressure. The products prepared in the absence of a solvent may be recovered directly without essentially any further treatment while the added solvents may, if desired, be readily removed by conventional procedures.

The reactant B employed in producing the products of this invention are a class of compounds which are well known in the art and thus their preparation by conventional procedures is similarly well known. The long, hydrophobic aliphatic chain (R) of these compounds may be monounsaturated as well as saturated, straight chain or branched. The generally preferred compounds are those wherein R is a hydrocarbon group containing 12 to 18 carbom atoms sand $R_1$ and $R_2$ are hydrogen; or mixtures thereof containing not more than 75% by weight of a compound II in which R is a monounsaturated group of 14 to 18 carbon atoms.

A particular aliphatic hydrocarbon chain may comprise a mixture of various aliphatic groups, e.g., the "coco" chain contains, in addition to $C_{12}$, other aliphatic chains such as $C_{10}$, $C_{14}$, $C_{16}$, $C_{18}$ and minor amounts of $C_6$ and $C_8$ which may be tolerated in the products.

When $x$ is 0 and $R_2$ is hydrogen in the generic formula above, the compounds may be represented by the following formula:

$$R-NH_2$$

where
R is as above defined. Examples of fatty monoamines suitable for the purpose of this invention include N-decyl amine, N-dodecyl amine, N-coco-amine, N-tetradecyl amine, N-hexadecyl amine, N-stearyl amine, N-tallowyl-amine (Tallowyl describes the mixture of $C_{14}$ to $C_{18}$ fatty acids obtained from tallow.), the N-eicosyl amine. Preferred amines are those wherein the hydrocarbon group contains predominantly between 12 to 18 carbon atoms, e.g., N-dodecyl amine, N-coco-amine and N-stearyl amine.

When $x$ is 1 and $R_1$ and $R_2$ are hydrogen, the compounds may be represented by the following formula:

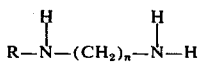

where R and n are as above defined. Examples of fatty diamines suitable for the purpose of this invention include N-2-aminoethyl decyl amine, N-2-aminoethyl dodecyl amine, N-2-aminoethyl coco-amine, N-2-aminoethyl myristyl amine, N-2-aminoethyl palmityl amine, N-2-aminoethyl stearyl amine, N-2-aminoethyl tallowyl amine, N-3-aminopropyl decyl amine, N-3-aminopropyl dodecyl amine, N-3-aminopropyl coco-amine, N-3-aminopropyl myristyl amine, N-3-aminopropyl palmityl amine, N-3-aminopropyl stearyl amine, N-3-aminopropyl tallowyl amine and N-3-aminopropyl hydrogenated tallowyl amine. Preferred diamines are those wherein the hydrocarbon group contains 14 to 20 carbon atoms, e.g., N-2-aminoethyl stearyl amine, N-2-aminoethyl tallowyl amine, N-3-aminopropyl palmityl amine, N-3-aminopropyl stearyl amine, N-3-aminopropyl tallowyl amine and N-3-aminopropyl hydrogenated tallowyl amine.

When $x$ is 2 and $R_1$ and $R_2$ are hydrogen, the compounds may be represented by the formula:

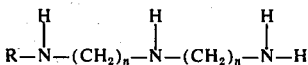

where R and n are as above defined. Examples of fatty triamines suitable for the purpose of this invention include 1-decyl diethylene triamine, 1-dodecyl diethylene triamine, 1-coco diethylene triamine, 1-myristyl diethylene triamine, 1-palmityl diethylene triamine, 1-stearyl diethylene triamine, 1-tallowyl diethylene triamine, 1-decyl dipropylene triamine, 1-dodecyl dipropylene triamine, 1-coco dipropylene triamine, 1-myristyl dipropylene triamine, 1-palmityl dipropylene triamine, 1-stearyl dipropylene triamine, 1-tallowyl dipropylene triamine and 1-hydrogenated tallow dipropylene triamine. Preferred triamines are those wherein the hydrocarbon group contains 14 to 20 carbon atoms, e.g, 1-stearyl diethylene triamine, 1-tallowyl diethylene triamine, 1-hydrogenated tallow diethylene triamine, and 1-hydrogenated tallow dipropylene triamine.

The products of the present invention are believed to be at least predominantly salts formed on reaction of the primary and/or secondary nitrogen atoms in reactant B with the bromoalkyl moieties in the compound I. The conclusion that the products are salts is supported by the chemical nature of the starting materials, the apparent lack of by-product formation and the improved water dispersibility of the products. The preferred softening agents of the present invention, in addition to being preferably derived from the preferred fatty amines, diamines and triamines indicated above are generally those which are obtained by the reaction of reactant B and the compound of the formula I in a weight ratio of from 3:1 to 1:1, more preferably from 2.5:1 to 1.5:1. While a weight ratio of 10:1 generally produces a softening agent which can be dispersed in water and which has reduced flammability, the weight ratios not in excess of 3:1, more preferably in the range of 2:5.1 to 1.5:1, are usually required in order to impart self-extinguishing properties to the product. Weight ratios which are less than 1:1 are generally undesirable as tending increasingly to substantially depreciate the properties which are desired in a softening agent. The particularly preferred products of the present invention, therefore, are obtained by the reaction of reactant B and the compound of the formula I at a weight ratio in the range of from 3:1 to 1:1, more preferably from 2.5:1 to 1.5:1 at a temperature regulated within the range of from 60°C. to 100°C. for a time of from 5 to 60 minutes, more preferably from 8 to 25 minutes. The softening agents provided by the invention are typically waxy solids which can be broken up and readily dispersed with mixing in hot water (ca 70°C.). The dispersions are generally slightly acidic, e.g., have a pH in the range of 3.5 to 6.5, more usually 4.0 to 6.0. As a practical matter, the water dispersibility and the stability of the dispersions are improved by the addition of minor quantities of water-soluble, organic surfactants which, in general, may be any of several well-known types. In general, such surfactants may be combined with the softening agents of the invention in amounts which are between 1.0% and 20% based on the weight of the softening agent, more usually in an amount between 5% and 15% based on the weight of the softening agent. The preferred surfactants are the nonionic surfactants and more especially those derived from condensing an aliphatic alcohol having from 8 to 22 carbon atoms with an alkylene oxide of 2 to 4 carbon atoms. The particular surfactant to be selected may depend upon a number of factors including the particular softening agent under consideration and the influence of the surfactant on various properties of the resulting dispersions. In general, it is preferred to use from 5.0% to 15% of an ethoxylated linear alcohol prepared by condensing a $C_{16}$ to $C_{18}$ alcohol or mixture thereof with 15 to 35 mols of ethylene oxide, such as that obtainable commercially under the trademark designation EKALINE G FLAKES (Sandoz-Wander, Inc.). The surfactants may be combined by conventional procedures with the softening agent of the invention after preparation of the softening agent. However, since many of the surfactants are more or less solid materials, it has been found convenient and preferred to incorporate the surfactant directly into the mixture in which the softening agents of the invention are produced, such surfactants being incorporated in to such mixtures in an amount of from 1.0% to 20%, preferably 5% to 15%, by total weight of the reactant A and reactant B in said mixture. The more preferred surfactants are, therefore, those which are relatively stable and inert under the conditions in which the softening agents of the invention are produced.

The products of the invention can be adapted for storage and sale in different forms. A solid form can be readily produced by the reaction of reactant A and reactant B, preferably in the presence of a surfactant. On the other hand, liquid forms constituting aqueous dispersions containing typically 3.0% to 40%, more usually 5.0% to 30%, by weight of the reaction product of the invention may also be made available. The fluidity of such dispersions containing the larger amounts of the reaction product of the invention may be readily adjusted to the desired level by the addition of any of several known agents suitable for this purpose and selected primarily for efficiency in relation to the particular product and compatability in the ultimate purpose for which it will be employed. For example, small quantities is isopropanol constituting approximatley 0.5% to 5.0% by weight based on the total weight of the reaction product and water in the dispersion may be employed to produce products for use by those wishing to apply softening agents to dyed carpet materials. While the dispersions may be readily prepared from the reaction products of the invention, it has been found convenient and preferred to produce such dispersions during the formation of the reaction product by forming the reaction products of the invention in an aqueous suspension medium which may also contain viscosity stabilizing agents, such as isopropanol, methanol, ethanol, acetone, ethylene glycol and the like, and also, if desired, the surfactant which may be desired in the final product. When prepared in this manner, the reaction product becomes dispersed in the water as it is formed and the resulting dispersion may be recovered, stored and sold substantially without further processing.

The reaction products of the present invention may be employed as softening agents for a variety of vegetable, animal or synthetic fibers or a mixture thereof, for instance, wool, cotton, jute, silk, regenerated cellulose, acetate rayon, or a polyamide, polyester, polyolefin, polyvinylidene chloride or polyacrylic fiber, or a mixture of a vegetable and/or synthetic fiber with wool. The fiber assembly may be, for instance, a pile yarn or fabric made from such fibers or fiber mixtures, for example, rugs, tufted carpets, other carpeting materials, upholstery, curtains, and "flock", bonded or printed materials. The reaction products may be applied using conventional techniques employed in the application of known softening agents; these products also provide good anti-soiling properties.

The following examples illustrate the preferred procedure to be followed in accordance with this invention; however, it should be understood that the examples are all illustrative only and not exclusive.

EXAMPLE 1

To a mixing tank is charged 12 parts of N-dodecyl amine along with 6 parts of tris-(2,3-dibromopropyl)-phosphate and the resulting mass is stirred at 70°–75°C. for 15 minutes. The resulting clear melt is cast into trays and cooled to obtain a waxy solid which can be readily broken up. This product is readily dispersible in hot water (ca 70°C.) and does not burn in a Candle test in which a lighted match is repeatedly applied to the wick of a small candle (3 cm. diameter made from the melting reaction product and a strand of asbestos yarn saturated with the melted softener, the results being evaluated both with respect to the wick and the candle body in this test.

EXAMPLE 2

A charge of 45 parts of N-dodecyl amine and 10 parts of an ethoxylated linear alcohol obtainable under the trademark EKALINE G FLAKES is melted in a mixing tank at 70°C. and there is then added 45 parts of tris-(2,3-dibromopropyl)phosphate. The resulting mass is stirred at 70°–80°C. for 15 minutes and the resulting clear melt is cast into trays and cooled to obtain a waxy solid which can be readily broken up. This product is readily dispersible in hot water and does not burn (neither wick nor candle body) in the Candle test.

When applied to white, loop-pile polyester carpeting, this softening agent imparts excellent anti-soiling properties, as evidenced by employing AATCC Test Method 122-1970 and measuring the carpet reflectance on the Hunterlab D-25 meter using the "whiteness" scale.

EXAMPLE 3

To a mixing tank is charged 12 parts of N-cocoamine along with 6 parts of tris-(2,3-dibromopropyl)-phosphate and the resulting mass is stirred at 70°–75°C. for 15 minutes. The resulting clear melt is cast into trays and cooled to obtain a waxy solid which can be readily broken up. This product is readily dispersible in hot water and does not burn (neither wick nor candle body) in the Candle test.

EXAMPLE 4

To a mixing tank is charged 12 parts of N-stearyl amine along with 6 parts of tris-(2,3-dibromopropyl)-phosphate and the resulting mass is stirred at 70°–75°C. for 15 minutes. The resulting clear melt is cast into trays and cooled to obtain a waxy solid which can be readily broken up. This product is readily dispersible in hot water and does not burn (neither wick nor candle body) in the Candle test.

EXAMPLE 5

A charge of 18 parts of N-dodecyl amine and 6 parts of tris-(2,3-dibromopropyl)phosphate is reacted as in Example 1. The product is dispersible in hot water and the wick burns only briefly while the candle body does not burn in the Candle test.

EXAMPLE 6

A charge of 24 parts of N-dodecyl amine and 6 parts of tris-(2,3-dibromopropyl)phosphate is reacted as in Example 1. The product is dispersible in hot water and the wick burns only briefly while the candle body does not burn in the Candle test.

EXAMPLE 7

A charge of 54 parts of N-dodecyl amine and 6 parts of tris-(2,3-dibromopropyl)phosphate is reacted as in Example 1. The product is dispersible in hot water and the wick burns while the candle body burns only briefly in the Candle test.

EXAMPLE 8

A charge of 78.9 parts of water, 1.1 parts of 91% isopropanol and 2.0 parts of EKALINE G FLAKES is mixed in a mixing tank at 50°C. until a clear solution is obtained. There is then added 6 parts of tris-(2,3-dibromopropyl)phosphate and the resulting mass stirred for 15 minutes at 50°C. There is then added 12 parts of N-dodecyl amine and the resulting mass is stirred at 70°–80°C. for 15 minutes to obtain an aqueous dispersion which is cooled to 60°C. and led into storage drums.

When applied to polyester shag carpeting of relatively light weight (41 ounces per square yard), which has been previously dyed, this dispersion imparts excellent softening properties with essentially the same inherent flame-resistant properties of the products of Examples 1 and 2, as evidenced by subjecting the carpet to the official U.S. Government "pill test".

EXAMPLE 9

To a mixing tank is charged 12 parts of N-3-aminopropyl hydrogenated tallowyl amine along with 6 parts of tris-(2,3-dibromopropyl)phosphate and the resulting mass is stirred at 70°–75°C. for 15 minutes. The resulting clear melt is cast into trays and cooled to obtain a waxy solid which can be readily broken up. The product is readily dispersible in hot water and does not burn (neither wick nor candle body) in the Candle test.

EXAMPLE 10

A charge of 45 parts of N-3-aminopropyl hydrogenated tallowyl amine and 10 parts of EKALINE G FLAKES is melted in a mixing tank at 70°C. and there is then added 45 parts of tris-(2,3-dibromopropyl)-phosphate. The resulting mass is stirred at 70°–80°C. for 15 minutes and the resulting clear melt is cast into trays and cooled to obtain a waxy solid which can be readily broken up. This product is readily dispersible in hot water and does not burn (neither wick nor candle body) in the Candle test.

When applied to white, loop-pile polyester carpeting, this softening agent imparts excellent anti-soiling properties, as evidenced by employing AATCC Test Method 122-1970 and measuring the carpet reflectance on the Hunterlab D-25 meter using the "whiteness" scale.

EXAMPLE 11

To a mixing tank is charged 12 parts of 1-tallowyl diethylene triamine along with 6 parts of tris-(2,3-dibromopropyl)phosphate and the resulting mass is stirred at 70°–75°C. for 15 minutes. The resulting clear melt is cast into trays and cooled to obtain a waxy solid which can be readily broken up. The product is readily dispersible in hot water and does not burn (neither wick nor candle body) in the Candle test.

EXAMPLE 12

A charge of 78.9 parts of water, 1.1 parts of 91% isopropanol and 2.0 parts of EKALINE G FLAKES is mixed in a mixing tank at 50°C. until a clear solution is obtained. There is then added 6 parts of tris-(2,3-dibromopropyl)phosphate and the resulting mass stirred for 15 minutes at 50°C. There is then added 12 parts of 1-tallowyl diethylene triamine and the resulting mass is stirred at 70°–80°C. for 15 minutes to obtain an aqueous dispersion which is cooled to 60°C. and led into storage drums.

When applied to polyester shag carpeting of relatively light weight (41 ounces per square yard), which has been previously dyed, the dispersion imparts excellent softening properties with essentially the same inherent flame-resistant properties of the product of Example 11, as evidenced by subjecting the carpet to the official U.S. Government "pill test".

Although certain preferred embodiments have been disclosed and described for purposes of illustration, it will be evident that various changes and modifications will occur to those skilled in the art without departing from the scope and spirit of the invention.

What is claimed is
1. A textile softening agent produced by reacting
A. the phosphate compound of the formula:

$(BrCH_2\text{-}CHBrCH_2O)_3PO$ with B. a compound of the formula:

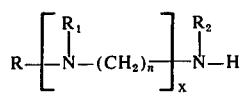

or a mixture thereof,
wherein
R is a monovalent aliphatic hydrocarbon radical containing 10 to 24 carbon atoms,
$R_1$ and $R_2$ are independently hydrogen, lower alkyl of 1 to 4 carbon atoms, or hydroxyalkyl of 2 to 3 carbon atoms,
n is 2 or 3, and
x is 0, 1, or 2, said reactant B and said phosphate compound being reacted in a weight ratio of from 10:1 to 1:1 at a temperature between 30°C. and 150°C. for a period of time between 2 minutes and 12 hours.

2. A softening agent in accordance with claim 1 in which the reactant B and phosphate compound are reacted in a weight ratio of from 3:1 to 1:1 at a temperature of from 40°C. to 130°C. for a period of time between 4 minutes and 2 hours.

3. A softening agent in accordance with claim 1 in which the reactant B and phosphate compound are reacted in a weight ratio of from 2.5:1 to 1.5:1 at a temperature of from 50°C. to 120°C. for a period of time between 5 and 60 minutes.

4. A softening agent in accordance with claim 1 in which the reactant B and phosphate compound are reacted in a weight ratio of from 2.5:1 to 1.5:1 at a temperature of from 60°C. to 100°C. for a period of time between 8 and 25 minutes in the absence of added solvent.

5. A softening agent in accordance with claim 1 in which reactant B is a compound of the formula:

$$R-\underset{\underset{H}{|}}{\overset{\overset{R_2}{|}}{N}}-H$$

where R and $R_2$ are as defined in claim 1.

6. A softening agent in accordance with claim 5 wherein $R_2$ is hydrogen.

7. A softening agent in accordance with claim 5 in which reactant B is selected from the group consisting of N-dodecyl amine, N-coco amino and N-stearyl amine.

8. A softening agent in accordance with claim 1 in which reactant B is a compound of the formula:

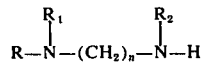

wherein R, $R_1$, $R_2$, and n are as defined in claim 1.

9. A softening agent in accordance with claim 8 wherein $R_1$ and $R_2$ are hydrogen.

10. A softening agent in accordance with claim 9 in which reactant B is selected from the group consisting of N-2-aminoethyl stearyl amine, N-2-aminoethyl tallowyl amine, N-3-aminopropyl stearyl amine, N-3-aminopropyl tallowyl amine, and N-3-aminopropyl hydrogenated tallowyl amine.

11. A softening agent in accordance with claim 1 in which reactant B is a compound of the formula:

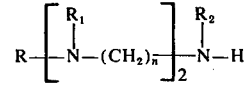

wherein R, $R_1$, $R_2$, and n are as defined in claim 1.

12. A softening agent in accordance with claim 11 wherein $R_1$ and $R_2$ are hydrogen.

13. A softening agent in accordance with claim 12 in which reactant B is selected from the group consisting of 1-stearyl diethylene triamine, 1-tallowyl diethylene triamine, 1-hydrogenated tallow diethylene triamine, 1-tallowyl dipropylene triamine and 1-hydrogenated tallow dipropylene triamine.

14. A softening agent in accordance with claim 2 and produced by reacting the reactant B and phosphate compound in the presence of from 1.0% to 20%, based on the weight of the softening agent, of a water-soluble, organic nonionic surfactant which is substantially inert in the reaction of said reactant B and phosphate compound.

15. A softening agent in accordance with claim 14 in which the reaction is carried out in the presence of from 5% to 15% of a water-soluble, organic nonionic surfactant.

16. A softening agent in accordance with claim 2 in aqueous-dispersed form and produced by reacting the reactant B and the phosphate compound in aqueous suspension, the total weight of the reactant B and phosphate compound constituting between 3% and 40% of the total weight of said reactant B, phosphate compound and water.

17. A softening agent in accordance with claim 16 and produced by reactant B and the phosphate compound in the presence of from 1.0% to 20%, based on the weight of the softening agent, of a water-soluble, organic nonionic surfactant inert in the reaction of said reactant B and phosphate compound.

18. A textile softened with a softening agent of claim 1.

* * * * *